(12) United States Patent
Kreidler

(10) Patent No.: US 10,928,802 B2
(45) Date of Patent: Feb. 23, 2021

(54) METHOD FOR OPTIMIZING THE PRODUCTIVITY OF A MACHINING PROCESS OF A CNC MACHINE

(71) Applicant: Cloudbased Industry 4.0 Technologies AG, Stans (CH)

(72) Inventor: Volker Kreidler, Hechingen (DE)

(73) Assignee: BIG DATA IN MANUFACTURING GMBH, Hechingen (DE)

( * ) Notice: Subject to any disclaimer, the term of this patent is extended or adjusted under 35 U.S.C. 154(b) by 663 days.

(21) Appl. No.: 15/521,569

(22) PCT Filed: Oct. 30, 2015

(86) PCT No.: PCT/CH2015/000158
§ 371 (c)(1),
(2) Date: Apr. 24, 2017

(87) PCT Pub. No.: WO2016/065491
PCT Pub. Date: May 6, 2016

(65) Prior Publication Data
US 2017/0308058 A1 Oct. 26, 2017

Related U.S. Application Data

(60) Provisional application No. 62/073,350, filed on Oct. 31, 2014, provisional application No. 62/073,381, (Continued)

(51) Int. Cl.
*G05B 19/4069* (2006.01)
*G05B 19/416* (2006.01)

(52) U.S. Cl.
CPC ..... *G05B 19/4069* (2013.01); *G05B 19/4163* (2013.01); *G05B 2219/35508* (2013.01);
(Continued)

(58) Field of Classification Search
CPC ............ G05B 19/4069; G05B 19/4163; G05B 2219/35508; G05B 2219/49067; G05B 2219/49369; G05B 2219/43057
See application file for complete search history.

(56) References Cited

U.S. PATENT DOCUMENTS 4,623,971 A * 11/1986 Ailman .............. G05B 19/4103
 318/561
4,878,002 A 10/1989 Heatzig et al.
(Continued)

FOREIGN PATENT DOCUMENTS

CN 1122018 A 5/1996
CN 101145047 A 3/2008
(Continued)

OTHER PUBLICATIONS

International Search Report and Written Opinion—PCT/CH2015/000160—dated Feb. 17, 2016.
(Continued)

*Primary Examiner* — Nathan L Laughlin
(74) *Attorney, Agent, or Firm* — Banner & Witcoff, Ltd.

(57) ABSTRACT

The present invention relates to a method for optimizing the productivity of a machining process of at least one CNC (Computer Numerical Control) machine, the CNC machine comprising at least one machining tool movable by one or a plurality of drive axes, the machining process being controlled by a given NC (Numerical Control) program defining at least a tool path for the at least one machining tool and a path velocity profile along the tool path, wherein the method includes increasing the path velocity along the tool path as compared to the path velocity profile defined by the given NC program, wherein increasing the path velocity along the tool path is effected in due consideration of the respective dynamical limit of each of the one or the plurality of drive axes, in particular in due consideration of the maximum (Continued)

axis-velocity and the maximum axis-acceleration of each of the one or the plurality of drive axes, and in due consideration of processing limits affecting the path velocity due to the machining capacity of the CNC machine, in particular of the machining tool. The method further comprises adapting the given NC program by the increased path velocity along the tool path.

14 Claims, 1 Drawing Sheet

Related U.S. Application Data filed on Oct. 31, 2014, provisional application No. 62/073,398, filed on Oct. 31, 2014, provisional application No. 62/073,435, filed on Oct. 31, 2014, provisional application No. 62/073,461, filed on Oct. 31, 2014.

(52) U.S. Cl.
CPC ............. *G05B 2219/43057* (2013.01); *G05B 2219/49067* (2013.01); *G05B 2219/49369* (2013.01)

(56) References Cited

U.S. PATENT DOCUMENTS

| | | | |
|---|---|---|---|
| 6,242,880 B1 | 6/2001 | Hong | |
| 6,428,252 B1 | 8/2002 | Oldani | |
| 6,535,788 B1 | 3/2003 | Yoshida et al. | |
| 2002/0091460 A1* | 7/2002 | Allen | G05B 19/4166 |
| | | | 700/173 |
| 2004/0162887 A1 | 8/2004 | Dillon et al. | |
| 2005/0004707 A1 | 1/2005 | Kazi et al. | |
| 2005/0113963 A1 | 5/2005 | Cho et al. | |
| 2007/0046677 A1 | 3/2007 | Hong et al. | |
| 2008/0313228 A1 | 12/2008 | Clark et al. | |
| 2009/0299509 A1 | 12/2009 | Diezel et al. | |
| 2010/0257228 A1 | 10/2010 | Staggs et al. | |
| 2011/0248821 A1 | 10/2011 | Merten | |
| 2013/0044115 A1 | 2/2013 | Oyama et al. | |
| 2013/0124465 A1 | 5/2013 | Pingel et al. | |
| 2013/0211555 A1 | 8/2013 | Lawson et al. | |
| 2013/0251342 A1 | 9/2013 | Park et al. | |
| 2014/0277686 A1 | 9/2014 | Wang et al. | |
| 2016/0275133 A1 | 9/2016 | Moore | |

FOREIGN PATENT DOCUMENTS

| | | |
|---|---|---|
| CN | 101278243 A | 10/2008 |
| CN | 101546184 A | 9/2009 |
| CN | 101615038 A | 12/2009 |
| CN | 102138110 A | 7/2011 |
| CN | 202135167 U | 2/2012 |
| CN | 102398226 A | 4/2012 |
| CN | 102449617 A | 5/2012 |
| CN | 102929219 A | 2/2013 |
| CN | 103337150 A | 10/2013 |
| CN | 103348694 A | 10/2013 |
| DE | 102004052790 B3 | 6/2006 |
| EP | 2538288 A2 | 12/2012 |
| EP | 2538290 A2 | 12/2012 |
| JP | 2013191128 A | 9/2013 |

OTHER PUBLICATIONS

International Search Report—PCT/CH2015/000158—dated Feb. 22, 2016.
International Search Report—PCT/CH2015/000159—dated Feb. 17, 2016.
Oct. 8, 2019—CN Office Action—App 201580059058—Eng Tran.
Weck et al "Machine tools 4—Automation of machines and systems" 6th edition, Springer-Verlag Berlin Heidelberg 1995, 2001, 2006.

\* cited by examiner

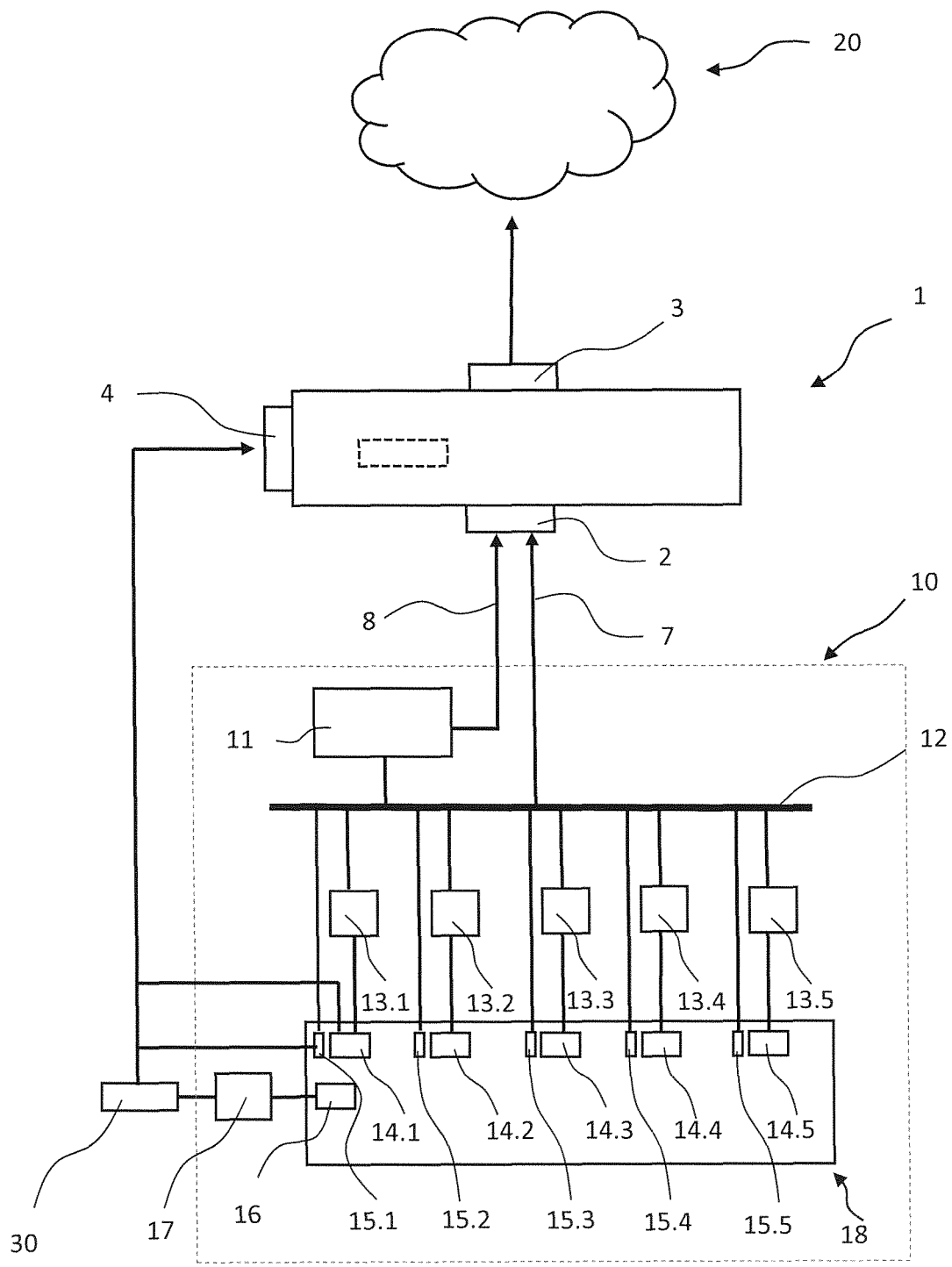

METHOD FOR OPTIMIZING THE PRODUCTIVITY OF A MACHINING PROCESS OF A CNC MACHINE

CROSS-REFERENCE TO RELATED APPLICATIONS

This application is a U.S. National Stage application under 35 U.S.C. § 371 of International Application PCT/CH2015/000158 (published as WO/2016/065491 A1), filed Oct. 30, 2015 which claims priority to U.S. Provisional Application No. 62/073,435 filed Oct. 31, 2014 U.S. Provisional Application No. 62/073,350 filed Oct. 31, 2014, U.S. Provisional Application No. 62/073,381 filed Oct. 31, 2014, U.S. Provisional Application No. 62/073,398 filed Oct. 31, 2014, and U.S. Provisional Application No. 62/073,461 filed Oct. 31, 2014. Benefit of the filing date of this prior application is hereby claimed. This prior application is hereby incorporated by reference in its entirety.

The present invention relates to a method for optimizing the productivity of a machining process of at least one CNC (Computer Numerical Control) machine with regard to a given NC (Numerical Control) program.

CNC machines referred to in the present invention typically comprise at least one machining tool movable by one or a plurality of drive axes. The machining process itself is controlled by a given NC (Numerical Control) program defining at least a tool path for the at least one machining tool as well as a path velocity profile along the tool path.

With regard to the process of NC-programming, the main objectives primarily focus on ensuring that the machine produces the required part geometry and part surface quality. For machine tools executing a cutting processes such as milling, grinding and turning, the cutting parameters are programmed in a way that first and foremost the cutting speed (speed between the tool edge and the material) fits to the material properties and the capabilities of the CNC machine. However, NC-programming as of today mostly does not max out the full processing potential of the machine because its dynamic properties are not fully understood or not completely considered as will be described now with regard to a milling process. As a result, the actual productivity of CNC machines is often far away from the theoretical maximum productivity.

Having a closer look to a milling process, the NC-programmer is using a CAM-system (Computer Aided Manufacturing) generating the NC-program for the CNC-machine. The productivity of the milling process strongly depends on parameters set by the CAM system such as axis velocity, axis acceleration, spindle speed, cutting speed and cutting volume of the milling tool. As of today, these parameters are typically determined as follows.

The maximum speed and acceleration of each drive axis is provided by the machine builder. These numbers are considered by the NC-programmer when programming the parameters of the tool path along which the machine tool is traveling during the milling process. To avoid any quality problems, NC-programmer usually choose speed and acceleration values much lower than the specified maximum values in order to ensure the required part quality.

The cutting speed which is the speed between the cutting edge of the cutter and the material results from the path velocity of the milling tool along the tool path (feed rate), the spindle speed (revolution) of the spindle drive used to turn the milling tool and the geometrical design of the milling cutter, at which the spindle speed is the dominant parameter. The preferred as well as the maximum cutting speed is defined by the cutter supplier which is different for different materials. During the NC-programming process the actual cutting speed is typically selected lower than the maximum defined speed by the cutter supplier as the NC-programmer who wants to avoid the risk that the machine will be overloaded, that the cutter is aging very fast and that the process results in bad part surfaces.

The volumetric intersection between the cutter tool and the material as well as the travel of the cutter along the tool path defines the volume being removed during milling. The higher the cutting volume, the higher the required cutting force is and the higher the required cutting power for the material removal is. With regard to required cutting forces and powers, limiting factors are given by the milling tool itself, the maximum power of the spindle as well as the dynamic stiffness of the CNC machine structure. Yet, today's CAM-systems do not provide any intelligence or algorithm to consider those limits for the NC-programming process, at least not for 5-axes milling operations. Hence, the NC program again uses a very conservative approach with regard to the maximum cutting volume and the maximum cutting load.

The NC-program generated by the CAM-system is further processed by a post processor which adapts the NC-program to the specific CNC-controller and capabilities of the target machine. As a result post processing, the productivity is further reduced. Finally, if a new NC program is to be fed into a CNC controller for the first time, the implementation and set up of the new manufacturing process is done by machine operators or NC programmers who typically reduce the feeds and speeds of the machine again before and during the machining process for safety reasons.

As a result, the machining process results in good parts matching all quality requirements. Yet, regarding productivity in terms of production time per part, the process is mostly far away from the maximum possible. We find the same situation for example with regard to drilling, turning, laser cutting, waterjet cutting and welding processes.

In conclusion, it can be stated that the realistic maximum productivity of a machining process is far away from the productivity actually used for the following reasons:

Safety and conservative oriented thinking of the NC-programmer;
CAM-systems use simplified, non-realistic machine models;
CAM-systems do not consider cutting volume for 5 axis operations;
Missing analytical IT-tools for productivity analysis and optimization;
Deficits of post-processor operation;
Safety- and conservative oriented thinking by the machine operator;

Hence, today's CNC machining processes do not max out their productivity potential due to insufficient consideration of the dynamic limits of drive axes, insufficient consideration of maximum cutting-speed of the tool, insufficient consideration of cutting volume.

Hence, it is an objective of the present invention to provide a method for optimizing the productivity of a given machining process of at least one CNC (Computer Numerical Control) machine defined by a given NC program.

According to the invention, this objective is achieved by the method according to claim 1.

The method according to the invention includes:
iteratively increasing the path velocity along the tool path as compared to the path velocity profile defined by the given NC program, wherein increasing the path velocity along the tool path is effected in due consideration of the respective dynamical limit of each of the one or the plurality of drive axes, in particular in due consideration of the maximum axis-velocity and the maximum axis-acceleration of each of the one or the plurality of drive axes, and in due consideration of processing limits affecting the path velocity due to the machining capacity of the CNC machine, in particular of the machining tool; and adapting the given NC program by the increased path velocity along the tool path.

According to the invention, it has been realized the common safety thinking in NC-programming disregards that the maximum speed and acceleration values defined by the machine builder actually do not reflect any limiting value with regard to a proper workpiece quality, but rather a maximum permissible value with regard to the damage threshold of the CNC machine and its dynamical capability. In the same way, it has been realized that extreme caution is exercised so far with regard to processing parameters affecting the path velocity as processing limit, and as such affect the productivity of the machining process.

For example, the revolution of a milling tool is very often selected lower than actually tolerable maximum cutting speed of the tool as the NC-programmer wants to avoid the risk of machine overloads, tool aging and bad part surfaces. However, reducing the revolution typically comes along with a reduction of the path velocity as a fixed ratio between spindle speed (revolution) and path velocity is to be kept up for other reasons. As the tool path velocity is directly proportional to the productivity of a given process, any unnecessary reduction of the path velocity automatically implies a loss of productivity.

Hence, in a first stage, the present invention teaches to iteratively increase the path velocity along the tool path as compared to the path velocity profile defined by the given NC program, in due consideration of the respective dynamical limit of each of the one or the plurality of drive axes, in particular in due consideration of the maximum axis-velocity and the maximum axis-acceleration of each of the one or the plurality of drive axes, as well as in due consideration of actual processing limits affecting the path velocity due to the machining capacity of the CNC machine. Doing so, the given NC program may then be adapted by the increased path velocity along the tool path (path velocity profile).

According to a preferred embodiment of the invention, increasing the path velocity along the tool path includes maximizing the path velocity along the tool path until the respective dynamical limit of the one or at least one of the plurality of drive axes is reached or until at least one of the processing limits is reached.

Increasing or maximizing the path velocity is preferably executed block by block over the entire NC program which typically includes a plurality of NC blocks, i.e. for each block of the NC program. Each NC block defines a specific sub process comprising a respective sub tool path, a respective sub path velocity and other processing parameters, e.g. the spindle speed (revolution) to drive the milling tool in case of a milling process. Each NC block may define a single value of the (sub) path velocity for the respective tool path which accounts for the geometry of the respective tool path. For example, if a tool path is strongly curved, the tool path velocity is typically much smaller as compared to a straight tool path.

Of course, the path velocity cannot be increased arbitrarily. The overall limit is determined by the pre-defined workpiece quality to be achieved. The easiest way to determine the absolute maximum path velocity with regard to the pre-defined workpiece quality would be a trial-and-error approach, namely, to iteratively increase the path velocity along the tool path in the NC program and to machine for each iteration a workpiece the quality of which is to be measured. This iteration process is to be repeated until the machined workpiece is out of the predefined measure for the quality of the workpiece or until the respective dynamical limit of the one or at least one of the plurality of drive axes is reached or until at least one of the processing limits is reached.

However, determining the workpiece quality using measuring systems as of today is very time consuming as the result of each respective measurement has to be awaited before the next iteration. If the machined workpiece is very complex, it could take days or even weeks to determine the quality of the workpiece. As of today, the most common way to do part measuring is to transfer the finished part to a measuring device. The disadvantage of this approach is the fact that manufacturing and measuring are two pretty much disconnected processes. Usually, there is no measurement within the machine, except for some cases of in-process-measurements which however allow for simple measurements only, such as measuring the position of a hole.

According to a preferred embodiment of the present invention, optimizing the productivity may be accomplished using a simulation-based method for "on-line" quality analysis of a CNC machining process as disclosed in the US provisional patent applications U.S. 62/073,381, titled "Virtual Quality- and Process-Control in Discrete Parts Manufacturing", as disclosed in the US provisional patent applications U.S. 62/073,350, titled "Digital Machine Models" and as disclosed in the international patent application under PCT, titled "A computer-implemented method for part analytics of a workpiece machined by at least one CNC machine", filed on Oct. 30, 2015 by the same applicant as of U.S. 62/073,381, U.S. 62/073,350 and the present application. The basic idea is to simulate the respective machining process under consideration by means of a digital machine model of the CNC machine that is provided with realtime and non-realtime process data recorded during the machining process. The simulation yields a virtually re-engineered model of the actually machined workpiece that may be easily compared with an ideal CAD model of the workpiece. Based on this comparison, the quality of the workpiece may be directly determined. The digital machine model may be a multibody-simulation model, a FEM model or just a pure geometric kinematic model of the CNC machine.

The method may be implemented as server application on a cloud-based platform the recorded data are transferred to. The data recording from the CNC machine and the data transfer to the cloud platform may be accomplished by a client device as disclosed in the US provisional patent application U.S. 62/073,398, titled "Big Data-Client for Embedded Systems", and as disclosed in the international patent application under PCT, titled "A client device for data acquisition and pre-processing of process-related mass data from at least one CNC machine or industrial robot", filed on Oct. 30, 2015 by the same applicant as of U.S. 62/073,398 and the present application.

Since the above described method bases on the "on-line" recording of the process data parallel to machining and as the method is preferably implemented on a cloud-based server, the result of the above described quality analysis application may be available nearly instantly or shortly after the machining process has been finished. Hence, information about the geometrical shapes and surfaces or surface roughness of the workpiece may be available in-process or immediately after the machining process, respectively, thus yielding instantly information about the quality of the workpiece. For this reason, this analysis method allows to tremendously reduce the time for optimizing the path velocity using the trial-and-error-approach as described above.

Hence, according to a preferred embodiment of the invention, maximizing the path velocity includes
a) machining a workpiece based on the actual NC program and recording realtime and non-realtime process data during the machining process under consideration;
b) simulating the machining process under consideration by means of a digital machine model provided with the recorded realtime and non-realtime process data to virtually re-engineer the workpiece machined during the recorded machining under consideration;
c) determining the quality of the machined workpiece with regard to a predefined quality measure by comparing the virtually re-engineered workpiece with a computer-aided-design (CAD) model of the workpiece;
d) increasing the path velocity along the tool path in the NC program;
e) repeating steps a) to d) until the virtually re-engineered workpiece is out of the predefined measure for the quality of the workpiece or until the respective dynamical limit of the one or at least one of the plurality of drive axes is reached or until at least one of the processing limits is reached.

As to the data to be recorded, the recorded realtime process data may primarily include tool path parameters, in particular a commanded and/or actual position, a commanded and/or actual speed, a commanded and/or actual acceleration, a commanded and/or actual jerk, a commanded and/or actual torque, a commanded and/or actual drive force and/or a commanded and/or actual drive current with regard to the drive axes of the CNC machine. In addition, the realtime data may comprise data from external measuring devices attached to the CNC machine. The recorded non-realtime process data may include the NC program code, machine configuration data, controller configuration data, drive configuration data, material properties of the workpiece, user actions during the machining process and/or configuration data of the processing tool, in particular tooling geometry and/or tooling characteristic.

According to another preferred embodiment of the invention, the method includes—as kind of a second stage for optimizing the productivity—increasing the processing limits affecting the path velocity to further increase the path velocity along the tool path, which in turn is to be effected in due consideration of the respective dynamical limit of each of the one or the plurality of drive axes and as well as in due consideration of the now increased processing limits.

Preferably, increasing the processing limits to further increase the path velocity may be accomplished by increasing the machining capacity which in turn may be accomplished by increasing at least one machining parameter that is capable to increase the machining capacity. With regard to a maximization of the path velocity and the productivity, the at least one machining parameter is preferably to be increased until a limit of the respective machining parameter is reached.

According to the invention, it has been realized that apart from the dynamical limits of the CNC machine, processing limits due to the limited machining capacity of the CNC machine that affect the path velocity are often the predominant limit for the overall productivity. For example, considering a laser cutting machine that allows for a maximum speed of 100 m/min and an accelerations of 1 g. The laser beam energy is e.g. 1 kW. Assuming the material is a steel plate of 10 mm thickness, then the maximum laser speed which may be applied during the process is only in the range of a few m/min because if the machine went faster, the laser beam energy would not be high enough to cut steel of 10 mm thickness. In this case, the machine axes are not the limiting factor of the laser cutting process. Vice versa, if the same laser cutting machine (maximum speed 100 m/min; maximum acceleration 1 g; maximum laser power 1 kW) is to cut very thin sheets of metal at a thickness of 0.1 mm, the laser power is high enough to cut this thin material even at a speed of more than 100 m/min. In this case the maximum speed and acceleration of the machine axes will be the limiting factor.

In general, the at least one machining parameter capable to increase the machining capacity may be one of:
in case of a milling or drilling machine: spindle speed and spindle power of the spindle for driving the milling or drilling tool;
in case of a turning machine: spindle speed and spindle power of the spindle for driving the work piece;
in case of a laser cutting machine: power of laser beam, energy density of laser beam and spot size of laser beam;
in case of a waterjet cutting machine: pressure of the waterjet, spot size of waterjet, amount of added abrasive.

With regard to the limit of the respective machining parameter, this may be determined by
in case of a milling or drilling machine: maximum spindle speed and/or maximum spindle power of the spindle for driving the milling or drilling tool and/or maximum cutting speed of the milling or drilling tool and/or maximum cutting volume per time of the milling or drilling tool and/or the maximum cutting load;
in case of a turning machine: maximum spindle speed and/or maximum spindle power of the spindle for driving the work piece and/or maximum cutting speed of the turning tool and/or maximum cutting volume per time of the turning tool and/or maximum cutting load;
in case of laser cutting machine: maximum power of laser beam and/or maximum energy density of laser beam and/or minimum spot size of laser beam;
in case of a waterjet cutting machine: maximum pressure of the waterjet, minimum spot size of the waterjet, maximum amount of added abrasive.

Referring again to the above example of laser cutting, if the actual laser power as currently set in the given NC program is the predominant limit to the path velocity and if the maximum laser power allows to further increase the machining capacity, the actual laser power may be increased to increase this processing limit and to allow for further increasing the path velocity.

In order to take into account for the increased processing limit, the method may further comprises adapting the given NC program by the at least one increased machining parameter capable to increase the machining capacity.

With regard to the maximum cutting load or maximum cutting volume per time being processing limits, the method may further comprise determining the maximum and/or actual cutting volume of the drilling, milling or milling tool and/or the maximum and/or actual cutting load for the given NC program using a material removal simulation. Such material removal simulation, especially for 5-axes machines may be provided by a CAM system, allowing to determine the material volume which is removed by the intersection between the enveloping body of the rotating cutter along its path and the material and the travel of the machine.

Alternatively or additionally, the maximum and/or actual cutting volume of the drilling, milling or milling tool and/or the maximum and/or actual cutting load for the given NC program may be measured/recorded in real time during a running machining process. For roughing applications, the cutting force is proportional to the current which is consumed by the spindle motor. Hence, by recording the spindle motor current, the cutting force and thus the cutting load can be calculated. Alternatively, the milling spindle can be equipped with a dynamometer-sensor which allows to measure the milling forces during the machining process. Furthermore, new so called "smart tools" may be used comprising integrated sensors to measure deviations, accelerations, cutting forces, temperatures and momenta.

According to another embodiment of the invention, the method may further provide a measure for or information about the unused productivity potential of the given NC program. For this, the method may further comprise determining the unused productivity potential of the given NC program by determining the difference between the processing time of the given NC program to be optimized and the processing time of the adapted NC program. The processing time of the given NC as well of the optimized program may be determined by running a simulation of the NC program, thereby measuring the processing time. Alternatively, the processing time may be directly measured in realtime during the machining process.

According to another embodiment of the invention, the machining limits affecting the path velocity—in case of a milling machine—may be further increased by adapting the machining strategy through
increasing the cutting depth; and/or
using a larger milling cutter; and/or
using a milling cutter with a different geometry; and/or
adapting the fixture of the work piece to be milled.

Further advantages and of the present invention emerge by using the exemplary embodiment illustrated in the following text and in conjunction with the FIGURE.

FIG. 1 illustrates an example of a system architecture that may be used by the method according to the present invention for optimizing the productivity of a machining process of a CNC machine.

In order to illustrate details of the method according to the present invention, a milling process using a 5-axes CNC milling machine is considered that is defined by a given NC program. According to the present invention, the NC program is to be optimized by increasing, preferably maximizing the path velocity along the tool path as compared to the path velocity profile defined by the given NC program. For this, increasing the path velocity along the tool path has to be effected in due consideration of the respective dynamical limit of each of the five drive axes, in particular in due consideration of the maximum axis-velocity and the maximum axis-acceleration of each drive axis.

Yet, increasing the path velocity along the tool path has also to be effected in due consideration of processing limits affecting the path velocity due to the machining capacity of the CNC machine, in particular of the milling tool. In the present example, the processing limits affecting the path velocity are the maximum cutting speed as well as maximum cutting load or maximum cutting volume, respectively. The maximum cutting speed in turn is limited by the cutter technology and cutter material. The maximum cutting load/ maximum cutting volume which is proportional to the cutting force represents a static and dynamic load on the cutter. The cutter, the cutter holder, the spindle and at the end the entire machine structure can only handle limited static and dynamic forces. If the forces exceed the structural capabilities of the entire machine, this may lead to path deviations caused by deflecting and twisting of the machine structure, to surface quality issue due to wrong angle and distances between the cutter and the material, to surface roughness problems due to vibrations, as well as to fast tool wear. Since the overall benchmark for increasing the productivity is determined by the workpiece quality to be still achieved, a preferred embodiment of the optimization method according to the invention teaches to maximizing the path velocity by
  a) machining a workpiece based on the actual NC program and recording realtime and non-realtime process data during the machining process under consideration;
  b) simulating the machining process under consideration by means of a digital machine model provided with the recorded realtime and non-realtime process data to virtually re-engineer the workpiece machined during the recorded machining under consideration;
  c) determining the quality of the machined workpiece with regard to a predefined quality measure by comparing the virtually re-engineered workpiece with a computer-aided-design (CAD) model of the workpiece;
  d) increasing the path velocity along the tool path in the NC program;
  e) repeating steps a) to d) until the virtually re-engineered workpiece is out of the predefined measure for the quality of the workpiece or until the respective dynamical limit of the one or at least one of the plurality of drive axes is reached or until at least one of the processing limits is reached.

FIG. 1 schematically illustrates a system architecture for instantly analyzing the quality of a workpiece as required by steps b) and c). This system allows for recording the realtime and non-realtime process data of a CNC machine 10 and for transferring said data a cloud-platform 20 on which a quality analytics method may be implemented on.

The CNC machine 10 is operated by a CNC controller 11 and comprises electrical drives 13.1-13.5 for each actuator 15.1-15.5 of the respective machine axes. The machining of a specific workpiece by the CNC machine is based on machining commands due to the given NC program which are converted by the CNC machine 10 into machining actions, i.e. into movements of the actors 14.1-14.5 of the different machine axes and into a rotary movement of a spindle actuator 16 of the milling tool. These actuators belong to the mechanical/machining part 18 of the CNC machine 10. For this, the CNC controller 11 generates corresponding command values for each axis and the milling tool which are communicated via a local fieldbus 12 to the electrical drives 13.1-13.5 of all axes and the electrical spindle drive 17 of the spindle actuator 16. The fieldbus 12 is a realtime communication fieldbus used for the internal communication of the CNC machine 10 between the CNC controller and the electrical drives 13.1-13.5, 17. The machine-embedded measuring devices/sensors 15.1-15.5 used for measuring the actual positions of each axis may also be connected to the fieldbus 12. In order to control the movement along each axis, the machine-embedded measuring devices 15.1-15.5, e.g. high-resolution linear scales, are continuously measuring the actual position for feedback via the fieldbus 12 to the CNC controller 11.

Still referring to FIG. 1, the CNC machine 10 is connected to the a client device 1 as disclosed in the US provisional patent application U.S. 62/073,398, titled "Big Data-Client for Embedded Systems", and as disclosed in the international patent application under PCT, titled "A client device for data acquisition and pre-processing of process-related mass data from at least one CNC machine or industrial robot", filed on Oct. 30, 2015 by the same applicant as of U.S. 62/073,398 and the present application.

The client device 1 is configured for recording and pre-processing the process mass data from the CNC machine 10 as well as for transmitting said process mass data to the cloud-platform 20. For this, the client device 1 comprises a first data communication interface 2 to the CNC controller 11 of the CNC machine 10 for continuously recording the realtime process data via a realtime data channel 7 and for recording the non-realtime process data via at least one non-realtime data channel 8. For the purpose of quality control, the recorded realtime process data may primarily include tool path parameters, in particular commanded and/or actual positions; and moreover those data as mentioned above. In addition, a force-sensor 30 is installed in the spindle actuator 17 of the milling tool 16 that is directly connected to the client device 1 via the further data interface 4. Having access to these milling force data may enable to determine the cutting load which is a processing limit affecting the productivity of the milling process as explained above. Also with regard to quality analysis, the recorded non-realtime process data may primarily include configuration data of the processing tool, in particular tooling geometry and/or tooling characteristics as well as the NC program code, machine configuration data, controller configuration data, drive configuration data, material properties of the workpiece.

The client device 1 further comprises a second data communication interface 3 for transmitting the recorded process data to the cloud-platform 20. The client device is also configured to pre-process the recorded data before transmission to the server 20, in particular to contextualize the recorded non-realtime data to the recorded realtime data as described above.

Now referring again to steps b) and c) of the present exemplary embodiment of the method, the re-engineering of the workpiece machined by the milling machine 10 can be realized by first calculating the tool path of the milling tool based on a digital machine model provided with the realtime and non-realtime process data recorded during the machining process. Most easily, the actual tool path may be calculated by providing a kinematic model of the CNC machine 10 with the actual positions of the drive axes used to move the milling tool recorded during each machining process. Subsequently, the geometry and milling characteristic of the milling tool has to be considered in order to re-engineer the workpiece surfaces along the simulated tool paths. This virtual re-engineering may be simply effected by material removal simulation as generally kwon from prior art. For each iteration this re-engineering yields a virtual surface of the actually machined workpiece, and most important, almost instantly with regard to the end of the milling process.

Due to this fast response time of the described quality analysis method, maximization of path velocity with regard to the pre-defined workpiece quality may be efficiently done using the described trial-and-error approach, namely, to iteratively increase the path velocity along the tool path in the NC program and to machine for each iteration a workpiece the quality of which is determined by said quality analysis method, until the machined workpiece is out of the predefined measure for the quality of the workpiece or until the respective dynamical limit of the one or at least one of the plurality of drive axes is reached or until at least one of the processing limits is reached. In particular for series production, such a trial-and-error approach may be reasonable as measured to the complexity of forward-simulation-based optimization methods.

In addition, the recorded realtime and non-realtime data automatically include the processing time for machining the respective workpiece for each iteration. Hence, the described method automatically further provides information about the unused productivity potential of the given NC program, which is the difference between the processing time of the given (start) NC program to be optimized and the processing time of the adapted NC program.

What is claimed:

1. A method for optimizing productivity of a machining process of at least one computer numerical control (CNC) machine, the CNC machine comprising at least one machining tool movable by one or a plurality of drive axes, the machining process being controlled by a given numerical control (NC) program defining at least a tool path for the at least one machining tool and a path velocity profile along the tool path in one or more blocks, the method comprising:
  iteratively increasing the path velocity along the tool path as compared to the path velocity profile defined by the given NC program, wherein iteratively increasing the path velocity along the tool path is based on a respective dynamical limit of each of the one or the plurality of drive axes, the respective dynamical limit being based on the maximum axis-velocity and the maximum axis-acceleration of a given drive axis and based on each of the one or the plurality of drive axes, and based on processing limits affecting the path velocity due to a machining capacity of the machining tool; and
  storing, for at least a portion of the tool path, the increased path velocity in one or more blocks of the given NC program, resulting in an adapted NC program wherein iteratively increasing the path velocity along the tool path includes maximizing the path velocity along the tool path until the respective dynamical limit of the one or at least one of the plurality of drive axes is reached or until at least one of the processing limits is reached, and
  wherein maximizing the path velocity includes:
    a) machining a workpiece based on the actual NC program and recording realtime and non-realtime process data during the machining process under consideration;
    b) simulating the machining process under consideration using a digital machine model provided with the recorded realtime and non-realtime process data to virtually re-engineer the workpiece machined during the recorded machining under consideration;
    c) determining a quality of the machined workpiece with regard to a predefined quality measure by comparing the virtually re-engineered workpiece with a computer-aided-design (CAD) model of the workpiece;
    d) increasing the path velocity along the tool path in the NC program; and
    e) repeating steps a) to d) until the virtually re-engineered workpiece is out of the predefined measure for the quality of the workpiece or until the respective dynamical limit of the one or at least one of the plurality of drive axes is reached or until at least one of the processing limits is reached.

2. The method according to claim 1,
wherein the recorded realtime process data include at least one of:
- tool path parameters of at least one processing tool comprising, with regard to at least one linear or rotary drive axis, at least one of a commanded and/or actual position, a commanded and/or actual speed, a commanded and/or actual acceleration, a commanded and/or actual jerk, a commanded and/or actual torque, a commanded and/or actual drive force and/or a commanded and/or actual drive current;
- a process-related force, torque, pressure, torsion, bending, strain, vibration, temperature and/or energy consumption of at least one part of the CNC machine; and wherein the recorded non-realtime process data include at least one of:
- a numerical control (NC) program code and/or NC program configuration data comprising a respective active NC program line or NC block;
- machine configuration data, drive configuration data and/or controller configuration data;
- material properties of the workpiece;
- user actions during the machining process; and
- configuration data of a processing tool comprising tooling geometry and/or tooling characteristic.

3. The method according to claim 2, wherein the tooling characteristic includes material removal.

4. The method according to claim 1, wherein the machine model is a kinematic model, a multibody-simulation model or a finite-element-method (FEM) model of the CNC machine.

5. The method according to claim 1, wherein the method includes increasing the processing limits affecting the path velocity to further increase the path velocity along the tool path in due consideration of the respective dynamical limit of each of the one or the plurality of drive axes and in due consideration of the increased processing limits.

6. The method of claim 5, wherein increasing the processing limits to the path velocity includes increasing the machining capacity by increasing at least one machining parameter capable to increase the machining capacity, preferably until a limit of the respective machining parameter is reached.

7. The method of claim 6, wherein the at least one machining parameter capable to increase the machining capacity is one of
- in case of a milling or drilling machine: spindle speed and spindle power of the spindle for driving the milling or drilling tool;
- in case of a turning machine: spindle speed and spindle power of the spindle for driving a workpiece;
- in case of a laser cutting machine: power of laser beam, energy density of laser beam and spot size of laser beam; and
- in case of a waterjet cutting machine: pressure of the waterjet, spot size of waterjet, amount of added abrasive.

8. The method according to claim 6, wherein the limit of the respective machining parameter is determined by
- in case of a milling or drilling machine: maximum spindle speed and/or maximum spindle power of the spindle for driving the milling or drilling tool and/or maximum cutting speed of the milling or drilling tool and/or maximum cutting volume per time of the milling or drilling tool and/or the maximum cutting load;
- in case of a turning machine: maximum spindle speed and/or maximum spindle power of the spindle for driving the workpiece and/or maximum cutting speed of the turning tool and/or maximum cutting volume per time of the turning tool and/or maximum cutting load;
- in case of laser cutting machine: maximum power of laser beam and/or maximum energy density of laser beam and/or minimum spot size of laser beam; and
- in case of a waterjet cutting machine: maximum pressure of the waterjet, minimum spot size of the waterjet, maximum amount of added abrasive.

9. The method according to claim 6, wherein the method further comprising determining the maximum cutting volume of the drilling, milling or milling tool and/or the maximum cutting load using a material removal simulation.

10. The method according to claim 6, wherein the method further comprises adapting the given NC program by the at least one increased machining parameter capable to increase the machining capacity.

11. The method according to claim 5, wherein in case of a milling machine, increasing the machining limits to the path velocity includes adapting the machining strategy by at least one of:
- increasing the cutting depth;
- using a larger milling cutter;
- using a milling cutter with a different geometry; and
- adapting a fixture of a workpiece to be milled.

12. The method according to claim 1, wherein the method further includes determining the unused productivity potential of the given NC program by determining the difference between the processing time of the given NC program to be optimized and the processing time of the adapted NC program.

13. The method according to claim 1, wherein virtually re-engineering is implemented as a server application on a at least one server of an internal network or of an open network comprising as a cloud-based service or a cloud-based application residing on a cloud platform to which the recorded realtime and non-realtime process data are sent.

14. The method according to claim 1, wherein virtually re-engineering the workpiece includes calculating the tool path of a processing tool of the CNC machine using the digital machine model based at least partially on the recorded realtime and non-realtime process data and applying a material removal simulation or on a material addition simulation.

\* \* \* \* \*